(12) United States Patent
Mathur et al.

(10) Patent No.: US 11,463,390 B2
(45) Date of Patent: Oct. 4, 2022

(54) SELECTING ATTACHMENTS FOR ELECTRONIC MAIL MESSAGES

(71) Applicant: Citrix Systems, Inc., Fort Lauderdale, FL (US)

(72) Inventors: Nitin Kumar Mathur, Fort Lauderdale, FL (US); Nimish Agarwal, Bengaluru (IN); Rajat Mishra, Bengaluru (IN); Harshavardhan Gupta, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/051,758

(22) Filed: Aug. 1, 2018

(65) Prior Publication Data

US 2020/0045001 A1    Feb. 6, 2020

(51) Int. Cl.

| | |
|---|---|
| *H04L 51/08* | (2022.01) |
| *G06Q 10/10* | (2012.01) |
| *H04L 51/046* | (2022.01) |
| *H04L 67/06* | (2022.01) |
| *G06F 16/13* | (2019.01) |
| *G06F 16/242* | (2019.01) |
| *H04L 67/60* | (2022.01) |
| *H04L 67/01* | (2022.01) |

(52) U.S. Cl.
CPC .............. *H04L 51/08* (2013.01); *G06F 16/13* (2019.01); *G06F 16/243* (2019.01); *G06Q 10/1095* (2013.01); *H04L 51/046* (2013.01); *H04L 67/06* (2013.01); *H04L 67/60* (2022.05); *H04L 67/01* (2022.05)

(58) Field of Classification Search
CPC ....... H04L 67/10; H04L 51/046; H04L 51/08; H04L 67/06; H04L 67/32; H04L 67/42; G06F 17/30; G06F 16/13; G06F 16/243; G06Q 10/1095
USPC ........................................................ 709/206
See application file for complete search history.

(56) References Cited

U.S. PATENT DOCUMENTS

| | | | |
|---|---|---|---|
| 7,899,831 B2 * | 3/2011 | Drory ..................... | G06F 16/16 707/751 |
| 8,286,085 B1 * | 10/2012 | Denise ................. | G06Q 10/107 715/752 |
| 8,631,079 B2 * | 1/2014 | Affronti ............... | G06Q 10/107 709/205 |
| 8,943,153 B2 * | 1/2015 | Lewis .................. | G06Q 10/107 707/899 |
| 2010/0082713 A1 * | 4/2010 | Frid-Nielsen ........... | G06F 16/14 707/821 |

(Continued)

*Primary Examiner* — Thomas J Dailey
(74) *Attorney, Agent, or Firm* — Foley & Lardner LLP (57) ABSTRACT

Described embodiments provide systems and methods of selecting files to attach to an electronic mail. A server may identify, for each file of a plurality of files, a file context using content of each file. The server may identify, responsive to a request from a client for one or more attachments to add to an electronic mail, a mail context for the electronic mail based at least on content of the electronic mail. The server may compare the file context of at least one of the plurality of files with the mail context of the electronic mail. The server may select one or more files from the plurality of files based on the comparison of the file context with the mail context. The server may provide the client a list of the one or more files for selection as the one or more attachments for the electronic mail.

20 Claims, 4 Drawing Sheets

(56) References Cited

U.S. PATENT DOCUMENTS

| | | | |
|---|---|---|---|
| 2014/0149401 A1* | 5/2014 | Liu | G06F 16/951 |
| | | | 707/723 |
| 2018/0004398 A1* | 1/2018 | Zhong | G06F 3/04842 |
| 2019/0050406 A1* | 2/2019 | Nguyen | G06Q 10/107 |

* cited by examiner

SELECTING ATTACHMENTS FOR ELECTRONIC MAIL MESSAGES

FIELD OF THE DISCLOSURE

The present application generally relates to electronic mail and messages, including but not limited to systems and methods for selecting files for electronic mail messages.

BACKGROUND

An electronic mail may be composed in plaintext or as a Hypertext Markup Language (HTML) message through a mail user agent supported by a mail server. Attachments in the form of files may be also added to and sent along with the electronic mail. The files for attachments to the electronic mail may be retrieved from storage upon command using the mail user agent.

BRIEF SUMMARY

A mail user agent running on a client may be used to compose an electronic mail. A mail server infrastructure, including a mail transfer agent, a mail delivery agent, and a mail retrieval message, may send the electronic mail over a computer networked environment. The electronic mail may include header fields and a message body. The header field may specify a source address ("from") corresponding to an author of the electronic mail message, a recipient address ("to") corresponding to an intended recipient of the message, a subject for the message, and a time stamp, among other fields. The message body may contain content to be sent to the recipient address, and may be created using plaintext or Hypertext Markup Language (HTML). In addition, one or more files may be sent with the electronic mail as attachments to the recipient address. To find the files to be attached to the electronic mail, the mail user agent may present an interface with a file system directory. Using the file system directory interface, a user of the mail user agent may search through the file system directory, looking through folders and filenames of the file system directory for the desired files. This process of browsing through the file system directory may become cumbersome to the user of the mail user agent, especially if the user does not remember where the desired files are located within the file system directory. With the addition of multiple drives across various devices and the advent of cloud-based storage, the searching for the desired files from the file system directory may become even more 4845-8283-6399.1 unwieldy. Continuous browsing may result in excess a consumption of time, network bandwidth, and computing resources.

To address these technical challenges in searching for files as attachments to electronic mail, the present systems and methods may search through the hierarchy of the file system directory to select the files most likely to be attachments for the electronic mail. An attachment handler executing on one of the servers of the mail server infrastructure may access files locally stored on the client running the mail user agent or a separate database (e.g., cloud storage). The files may include any number of file types, such as text files, word documents, spreadsheets, images, audio, and videos, among others. The attachment handler may extract context from the file, such as a file name, keywords from content and metadata of the file, and a timestamp corresponding to a file upload or a file save. The extraction of the context for the file may be performed each time a file is stored onto the database accessible to the attachment handler. The attachment handler may store the context of each file for use in selecting attachments to future electronic mail created by the mail user agent. Upon receipt of a request from the mail user agent running on the client, the attachment handler may also extract context from the electronic mail composed by the user of the mail user agent. The context of the electronic mail may include the header fields (e.g., the source, recipient, and subject) and keywords from the content of the message of the electronic mail.

With the contexts of the electronic mail and the files of the user, the attachment handler may compare the context of the electronic mail against each context of files. To compare the contexts, the attachment handler may determine a semantic similarity between the context of the electronic mail and the context of each file. Based on the comparison of the contexts, the attachment handler may sort the files of the user. The more similar the context of the file is to the context of the electronic mail, it may be more likely that the corresponding file is to be selected as the attachment of the electronic mail. Conversely, the less similar the context of the file is to the context of the electronic mail, it may be less likely that the corresponding file is to be selected as the attachment of the electronic mail. The attachment handler may select a subset of the files with contexts having the highest semantic similarity with the context of the electronic mail. The selected subset of files may then be provided by the attachment handler to the mail user agent operating on the client.

When the selected subset of files is received, the mail user agent may display an interface with a list of files as recommendations for attachments to the electronic mail. From the list of files, the user of the mail user agent may indicate a selection of one or more files to attach to the electronic mail. The interface may also include a browse option in case to the user would like to manually search for files outside the provided list from the file system directory to attach to the electronic mail. If the user indicates a selection of a file outside the provided list of recommended files, the attachment handler may extract the context from the file for use in selecting attachments to future electronic mail created by the mail user agent. In this manner, the amount of time spent by the user in searching for the files to attach to the electronic mail may be reduced. Furthermore, the utilization of computing resources such as processing and memory on the client running the mail user agent may be saved, as the selection and provision of files to recommend as attachments may be implemented on the server.

At least one aspect of this disclosure is directed to a method of selecting files for electronic mail. A server may identify, for each of a plurality of files, a file context using content of each file. The server may identify, responsive to a request to add an attachment, a mail context for an electronic mail created by a client based at least on content of the electronic mail. The server may compare responsive to a request to add an attachment, a mail context for an electronic mail created by a client based at least on content of the electronic mail. The server may select, from the plurality of files, one or more files based on comparing the file contexts with the mail context. The server may provide, to the client for presentation, a list of the one or more files selectable as attachments for the electronic mail.

In some embodiments, the server may identify a selection of a file as an attachment for the electronic mail outside the list of the one or more files. In some embodiments, the server may determine a second file context of the file outside the list of the one or more files using content of the file. In some embodiments, the server may determine that the electronic mail references a calendar event based on at least the mail context. In some embodiments, the server may generate, responsive to determining that the electronic mail references the calendar event, a calendar event invite using the mail context. In some embodiments, the server may provide the calendar event invite with the list of one or more files for selection as the one or more attachments for the electronic mail.

In some embodiments, comparing the file context with the mail context may include determining a correlation score between the file context and the mail context. The correlation score may indicate a semantic similarity between the file context of the at least one of the plurality of files and the mail context of the electronic mail. In some embodiments, comparing the file context with the mail context may include determining a correlation score between the file context and the mail context. The correlation score may indicate a temporal similarity between the file context of the at least one of the plurality of files and the mail context of the electronic mail. In some embodiments, selecting the one or more files may include selecting, from the plurality of files, the one or more files with correlation scores greater than a threshold score. Each correlation score may indicate a semantic similarity between the file context of the corresponding file and the mail context.

In some embodiments, identifying the file context may include identifying the file context using metadata of the file. The file context may include at least one of a filename, a timestamp corresponding to uploading of the file, and one or more keywords included in the content of the file. In some embodiments, identifying the mail context may include identifying the mail context using the content having a header field and a message body of the electronic mail. The mail context may include at least one of a subject identifier of the electronic mail, a time identifier corresponding to creation of the electronic mail, and one or more keywords included in the content of the electronic mail.

At least one aspect of this disclosure is directed to a system for selecting files for electronic mail. The system may include one or more processors coupled to memory. The one or more processors may identify, for each file of a plurality of files, a file context using content of each file. The one or more processors may identify, responsive to a request from a client for one or more attachments to add to an electronic mail, a mail context for the electronic mail based at least on content of the electronic mail. The one or more processors may compare the file context of at least one of the plurality of files with the mail context of the electronic mail. The one or more processors may select one or more files from the plurality of files based on the comparison of the file context with the mail context. The one or more processors may provide the client a list of the one or more files for selection as the one or more attachments for the electronic mail.

In some embodiments, the one or more processors may identify a selection of a file as an attachment for the electronic mail outside the list of the one or more files. In some embodiments, the one or more processors may determine a second file context of the file outside the list of the one or more files using content of the file. In some embodiments, the one or more processors may determine that the electronic mail references a calendar event based on at least the mail context. In some embodiments, the one or more processors may generate, responsive to determining that the electronic mail references the calendar event, a calendar event invite using the mail context. In some embodiments, the one or more processors may provide the list of the one or more files with the calendar event invite selectable as attachments for the electronic mail.

In some embodiments, the one or more processors may determine a correlation score between the file context and the mail context. The correlation score may indicate a semantic similarity between the file context of the at least one of the plurality of files and the mail context of the electronic mail. In some embodiments, the one or more processors may sort the one or more files of the plurality of files by corresponding correlation scores. Each correlation score may indicate at least one of a semantic similarity and a temporal similarity between the file context of the corresponding file and the mail context for the electronic mail. In some embodiments, the one or more processors may select, from the plurality of files, the one or more files with correlation scores greater than a threshold score. Each correlation score may indicate a semantic similarity between the file context of the corresponding file and the mail context.

In some embodiments, the one or more processors may identify the file context using metadata of the file. The file context may include at least one of a filename, a timestamp corresponding to uploading of the file, and one or more keywords included in the content of the file. In some embodiments, the one or more processors may identify the mail context using the content having a header field and a message body of the electronic mail. The mail context may include at least one of a subject identifier of the electronic mail, a time identifier corresponding to creation of the electronic mail, and one or more keywords included in the content of the electronic mail.

At least one aspect of this disclosure is directed to a method of selecting files for electronic mail. A client having one or more processors may detect a request for one or more attachments to add to an electronic mail. A mail context based on at least content of the electronic mail may be determined responsive to the request. The client may send, to a server, a second request for one or more files to present for selection to add to the electronic mail based on comparing a file context of at least one of a plurality of files with the mail context of the electronic mail. The client may receive, from the server, a list of one or more files for selection as the one or more attachments for the electronic mail.

In some embodiments, the client may detect a selection of a file as an attachment for the electronic mail outside the list of the one or more files. In some embodiments, the client may send the selection of the file outside the list to the server to cause the server to determine a second file context of the file outside the list of the one or more files using content of the file. In some embodiments, the client may parse the electronic mail to determine that the electronic mail references a calendar event based on at least the mail context. In some embodiments, the client may send, responsive to determining that the electronic mail references the calendar event, a request for calendar events including the mail context to cause the server to generate a calendar event invite using the mail context. In some embodiments, receiving the list may include receiving a list of calendar events with the calendar event invite selectable as attachments for the electronic mail.

In some embodiments, the client may provide, to the server, access to the plurality of files to cause the server to generate the file context for at least one of the plurality of files. In some embodiments, receiving the list may include receiving the list of the one or more files sorted by corresponding correlation scores, each correlation score indicating a semantic similarity between the file context of the corresponding file and the mail context. In some embodiments, identifying the mail context may include identifying the mail context using the content having a header field and a message body of the electronic mail. The mail context may include at least one of a subject identifier of the electronic mail, a time identifier corresponding to creation of the electronic mail, and one or more keywords included in the content of the electronic mail.

BRIEF DESCRIPTION OF THE FIGURES

The foregoing and other objects, aspects, features, and advantages of the present solution will become more apparent and better understood by referring to the following description taken in conjunction with the accompanying drawings, in which.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes systems and methods for selecting files for electronic mail.

A. Computing Environment

Prior to discussing the specifics of embodiments of the systems and methods detailed herein in Section B, it may be helpful to discuss the computing environments in which such embodiments may be deployed.

Figure 1:
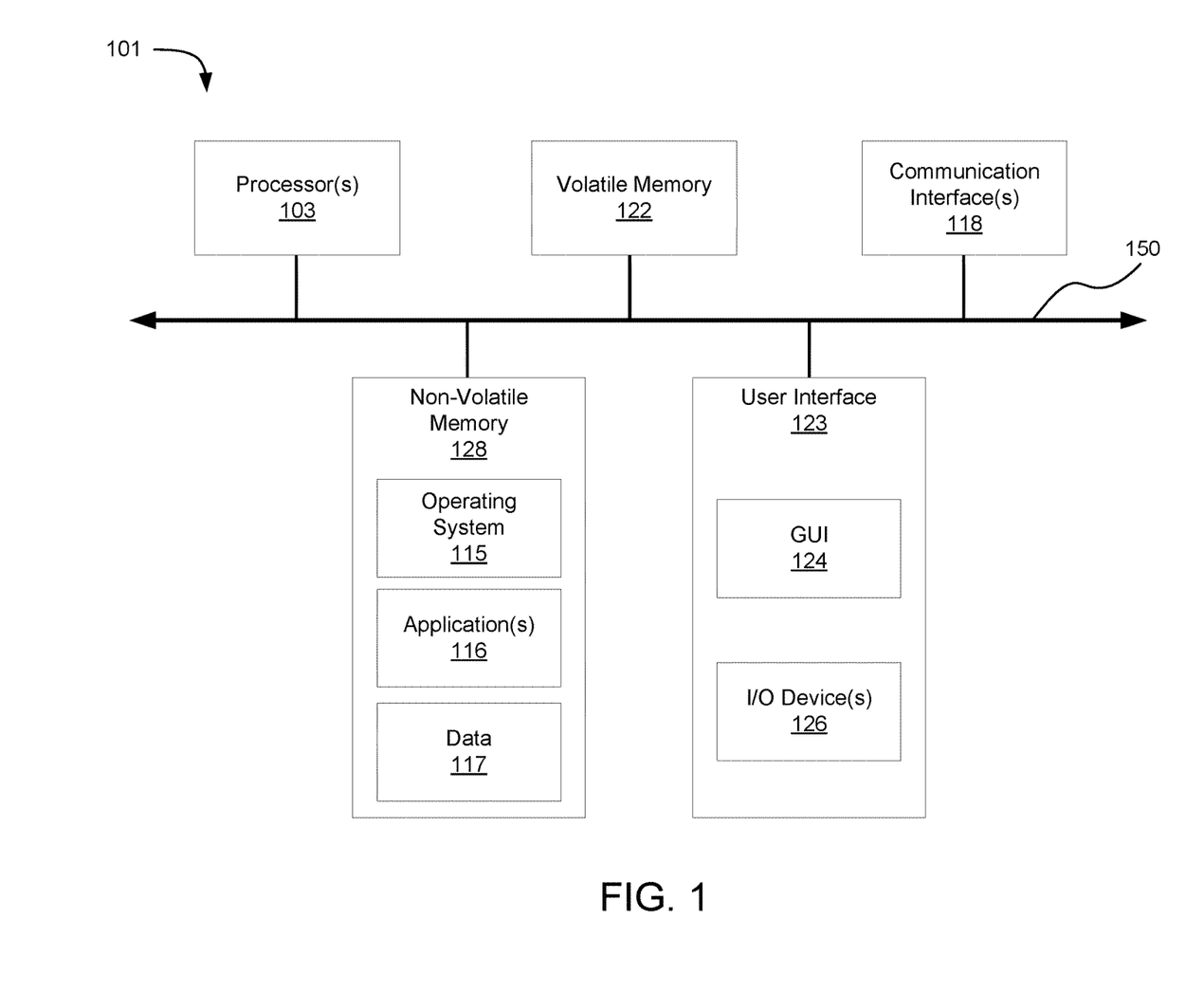
FIG. 1 is a block diagram of embodiments of a computing device.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Selecting Files for Electronic Mail

Figure 2:
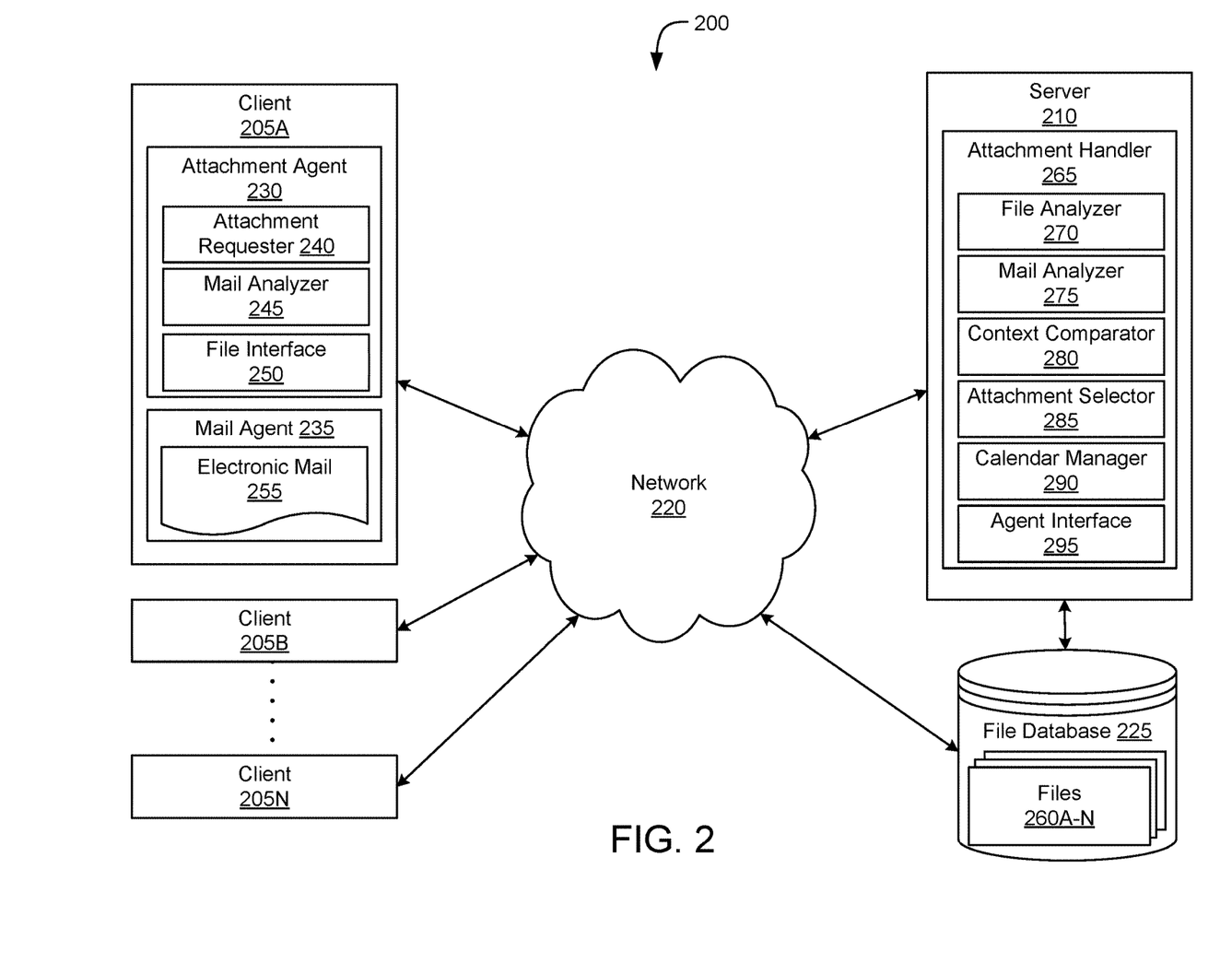
FIG. 2 is a block diagram of an example embodiment of a system for selecting files for electronic mail.

Referring now to FIG. 2, depicted is a block diagram of an example embodiment of a system 200 for selecting files for electronic mail. In overview, the system 200 may include one or more clients 205A-N (hereinafter generally referred to as client 205), at least one server 210, and at least one file database 225. The clients 205, the server 210, and the file database 225 may be communicatively coupled with one another via at least one network 220. In some embodiments, the network 220 may be a private network (e.g., an Intranet or a virtual private network) among the one or more clients 205, the server 210, and the file database 225. In some embodiments, the network 220 may be a public network (e.g., the Internet) among the one or more clients 205, the server 210, and the file database 225.

At least one of the clients 205 may include an attachment agent 230 and a mail agent 235 to generate an electronic mail 255 (also referred to as an electronic message). The attachment agent 230 may include an attachment requester 240 to identify requests for file attachments. The attachment agent 230 may include a mail analyzer 245 to identify a mail context of the electronic mail 255. The attachment agent 230 may include a file interface 250 to provide and display a list of files to recommend as attachments to the electronic mail 255. In some embodiments, the attachment agent 230 may be an application separate from the mail agent 235 and interfacing with the mail agent 235. In some embodiments, the attachment agent 230 may be an extension (e.g., an add-on or a plug-in) to the mail agent 235. In some embodiments, the mail agent 235 may be provided or supported by one or more servers an electronic mail infrastructure. In some embodiments, the mail agent 235 may be a web application accessed via a web browser on the client 205. In some embodiments, the mail agent 235 may be a standalone application installed on the client 205.

The server 210 may include an attachment handler 265. In some embodiments, the server 210 may be one or more of the servers or agents in the electronic mail infrastructure, such as a mail submission agent (MSA), a mail transfer agent (MTA), a mail delivery agent (MDA), or a mail retrieval agent (MRA). In some embodiments, the server 210 may be a dedicated server separate from the electronic mail infrastructure. In some embodiments, the server 210 may be an intermediary device to deliver the electronic mail 255 from one client 205 to another client 205. The attachment handler 265 may include a file analyzer 270 to identify a file context of each file. The attachment handler 265 may include a mail analyzer 275 to identify a mail context of the electronic mail 255. The attachment handler 265 may include a context comparator 280 to compare the mail context against the file contexts. The attachment handler 265 may include an attachment selector 285 to select one of the files based on the comparison. The attachment handler 265 may include a calendar manager 290 to generate a calendar event from the mail context. The attachment handler 265 may include an agent interface 295 to interface communications with the attachment agent 230 or the mail agent 235 executing on the client 205. In some embodiments, the attachment handler 265 may be part of the attachment agent 230 or the mail agent 235 running on the client 205. The file database 225 may store and maintain one or more files 260A-N (hereinafter general referred to as file 260) received from at least one of the clients 205. In some embodiments, the file database 225 may be part of the server 210 or otherwise accessible by the server 210. In some embodiments, the file database 225 may be part of a remote storage system, such as a file-hosting service, a cloud-based storage system, or a remote backup service, among others.

Each of the above-mentioned elements or entities is implemented in hardware, or a combination of hardware and software, in one or more embodiments. Each component of the system 200 may be implemented using hardware or a combination of hardware or software detailed above in connection with FIG. 1. For instance, each of these elements or entities can include any application, program, library, script, task, service, process or any type and form of executable instructions executing on hardware of the client 205 (including the attachment agent 230 and the mail agent 235), the server 210 (including the attachment handler 265), and the file database 225. The hardware can include circuitry such as one or more processors in one or more embodiments.

Figure 3:
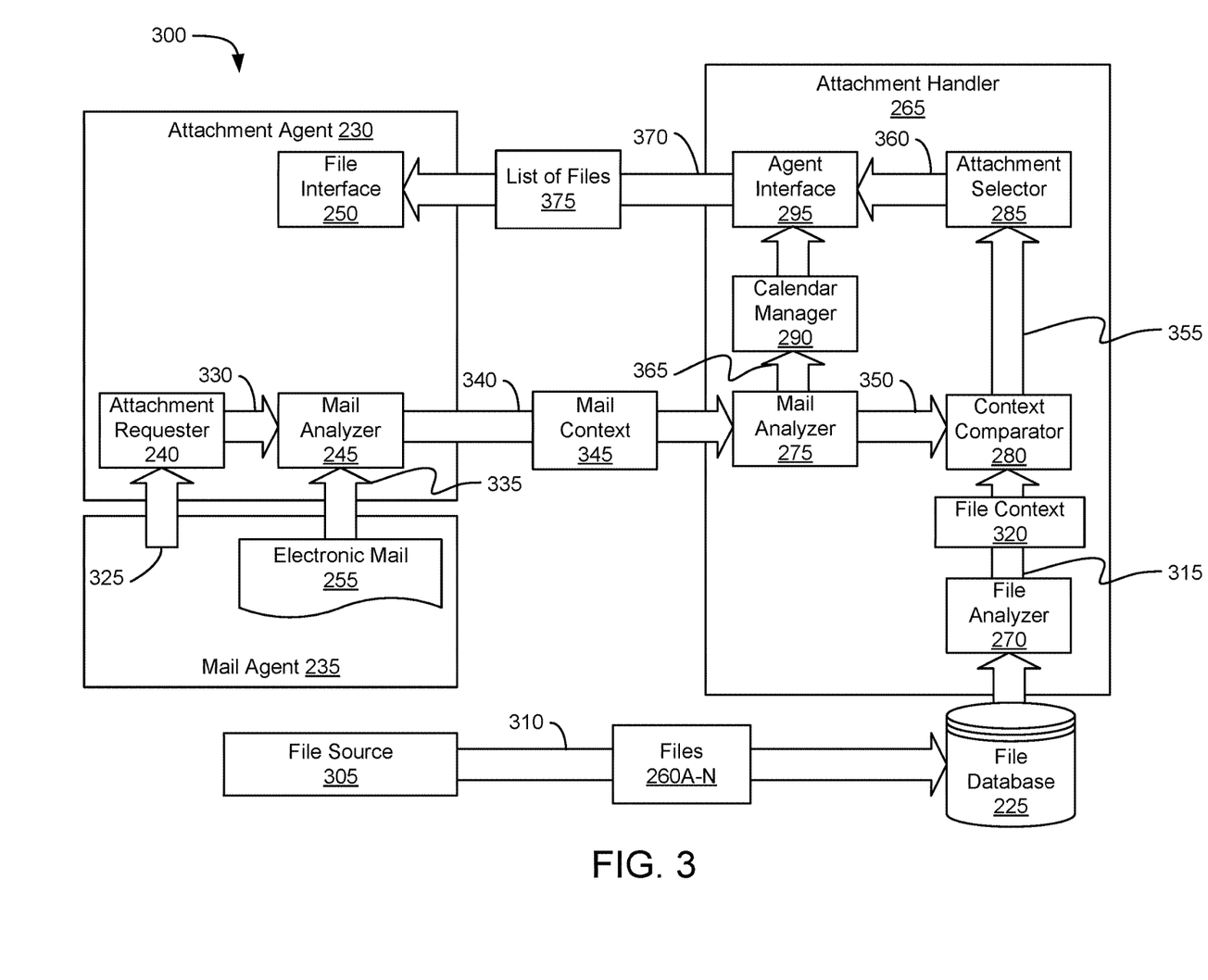
FIG. 3 is a functional block diagram of an example embodiment of a system for selecting files for electronic mail.

Referring now to FIG. 3 in conjunction with FIG. 2, depicted is a functional block diagram of an example embodiment of a system 300 for selecting files for electronic mail. The system 300 may include one or more components of the system 200, among others. The system 300 may also include a file source 305. In overview, the file source 305 may send the one or more files 260 to the file database 225 (data flow 310). The file analyzer 270 may access the files 260 stored on the file database 225 and may identify a file context 320 from each file 260 (data flow 315). Independently, the attachment requester 240 may receive a request for attachments to add to the electronic mail 255 (data flow 325) and may forward the request to the mail analyzer 245 (data flow 330). In response, the mail analyzer 245 of the attachment agent 230 may access the electronic mail 255 created using the mail agent 235 (data flow 335). The mail analyzer 245 may identify a mail context 345 from the electronic mail 255, and may provide the mail context 345 to the mail analyzer 275 of the attachment handler 265 (data flow 340). The mail analyzer 275 may provide the mail context 345 to the context comparator 280 (data flow 350). The context comparator 280 may compare the file context 320 with the mail context 345, and may provide results of the comparison to the attachment selector 285 (data flow 355). Based on the results of the comparison between the file context 320 and mail context 345, the attachment selector 285 may select one or more files 260 and provide the selection to the agent interface 295 (data flow 360). The calendar manager 290 may generate a calendar invite using the mail context 345, and may provide a calendar invite as a file for the electronic mail 255 (data flow 365). Using the selection, the agent interface 295 may provide a list of files 375 to the file interface 250 (data flow 370).

In further detail, the mail agent 235 may generate or create the electronic mail 255. The electronic mail 255 may be any form of an electronic message to be communicated over the network 220 between the clients 205. In some embodiments, the electronic mail 255 may be in accordance with email protocols, such as the Simple Mail Transfer Protocol (SMTP), the Post Office Protocol (POP) (e.g., POP3), and the Internet Message Access Protocol (IMAP), among others. In some embodiments, the electronic mail 255 may be in accordance with instant messaging (IM) protocols, such as the Session Initial Protocol (SIP), Application Exchange (APEX), Extensible Messaging and Presence Protocol (XMPP), and Instant Messaging and Presence Protocols (IMPP), among others.

The electronic mail 255 generated using the mail agent 235 may have one or more message headers and a message body. The message header may include a source identifier corresponding to a creator of the electronic mail 255. The source identifier may include an account identifier corresponding to the user logged into the mail agent 235 or created the electronic mail 255. The account identifier may be a screenname, a local part of an email address, or an entirety of the email address, among others. The message header may also include a recipient identifier or a recipient address corresponding to an intended recipient of the electronic mail 255. The recipient identifier may include an account identifier corresponding to the user intended to receive the electronic mail 255. The account identifier may be a screenname, a local part of an email address, or an entirety of the email address, among others. The message header may also include a subject identifier for the electronic mail 255. The message header may also include a time stamp corresponding to a creation of the electronic mail 255. In some embodiments, the message header may include a timestamp for each of one or more revisions of the electronic mail 255. The message body may include content created using plaintext or Hypertext Markup Language (HTML). The content of the message body in the electronic mail 255 may, for example, include text, image, video, or HTML script, among others.

In some embodiments, the electronic mail 255 may include a thread or chain of messages, in addition to the currently generated message header and message body. The thread of messages may include messages previously received and sent in sequence by the mail agent 235. In some embodiments, the thread of messages may each message header and message body of the previously received and sent messages. Each message header of the previously received messages may include a timestamp corresponding to receipt by the recipient mail agent 235 that received the message and a timestamp corresponding to sending by the transmitting mail agent 235 that generated the message. The message headers of the previously sent messages may include a timestamp corresponding to receipt by the recipient mail agent 235 that received the message and a timestamp corresponding to sending by the transmitting mail agent 235 that generated the message.

The attachment requester 240 may identify, detect, or receive a request to add attachments to the electronic mail 255. The attachment requester 240 may interface with the mail agent 235 in identifying or detecting the request to add attachments to the electronic mail 255. In response to detecting the request, the attachment requester 240 may transmit or provide the request to add attachments to the attachment handler 265 of the server 210 via the network 220. In some embodiments, the attachment requester 240 may detect an interaction with a graphical user interface (GUI) element of the mail agent 235 corresponding to the request. The GUI element may be labeled to indicate a request to add attachments. For example, the GUI element may be a button with a paperclip icon. The attachment requester 240 may identify the detection of the interaction with the GUI element as the request to add attachments to the electronic mail 255. In some embodiments, the attachment requester 240 may receive a command to add attachments to the electronic mail 255 from the mail agent 235. The command may be generated by the mail agent 235 in response to detecting an interaction with the corresponding GUI element on the mail agent 235.

In some embodiments, the attachment requester 240 may identify the request to add the attachments from the content of the electronic mail 255 itself. In some embodiments, the attachment requester 240 may parse the message body (e.g., the text) of the electronic mail 255 to identify one or more words. In some embodiments, the attachment requester 240 may initiate parsing of the message body of the electronic mail 255, in response to detecting an interaction with the GUI element corresponding to a sending of the electronic mail 255. The attachment requester 240 may compare each word of the electronic mail 255 with a set of keywords corresponding to the request to add attachments ("e.g., attached" or "enclosed"). When at least one word or phrase within the message body of the electronic mail 255 is determined to match one of the keywords in the set, the attachment requester 240 may identify the request to add attachments to the electronic mail 255.

In response to receipt of the request, the mail analyzer 245 may generate, determine, or identify the mail context 345 using the content of the electronic mail 255. The mail context 345 may include any information regarding the electronic mail 255 used to compare with the file contexts 320 of the files 260. The mail context 345 may include one or more of the message header fields and at least a portion of the message body of the electronic mail 255. In determining the mail context 345, the mail analyzer 245 may access the electronic mail 255 generated by the mail agent 230. In some embodiments, the mail analyzer 245 may send or provide a request to the attachment handler 265 on the server 210 to determine the mail context 345. The request may include the electronic mail 255, including at least some of the message headers and at least a portion of the message body. In some embodiments, with the electronic mail 255 accessed, the mail analyzer 245 may parse the content of the electronic mail 255, including the message header and the message body, to determine the mail context 345. In some embodiments, the mail analyzer 245 may transmit or provide the mail context 345 as part of the request to add attachments to the attachment handler 265 of the server 210 via the network 220. In some embodiments, the mail analyzer 245 may parse the message header of the electronic mail 255 to identify the source identifier, the source address, the recipient identifier, the recipient address, the subject identifier, the timestamp corresponding to creation of the electronic mail 255, or one or more timestamps corresponding to revisions of the electronic mail 255, among others, as the mail context 345. In some embodiments, the mail analyzer 245 may parse through the message headers of the thread of messages in the electronic mail 255. From parsing each message in the thread, the mail analyzer 245 may identify the timestamp corresponding to receipt of the message as the mail context 345. The mail analyzer 245 may identify the timestamp corresponding to sending of the message as the mail context 345.

In addition, the mail analyzer 245 may parse the message body of the electronic mail 255 to extract or identify one or more keywords included in the content of the message body as the mail context 345. The mail analyzer 245 may select a subset of keywords from the message body of the electronic mail 255 as the mail context 345 using various natural language processing and text mining techniques (e.g., term frequency-inverse document frequency (tf-idf)). To select the subset of keywords, the mail analyzer 245 may calculate or determine a number of occurrences of each word in the message body of the electronic mail 255. For each word, the mail analyzer 245 may generate a score for the word by adjusting the number of occurrences of each word in the message body of the electronic mail 255 by a weighing function (e.g., a logarithmic scale). The weighting function may produce a lower score for high-frequency words and low-frequency words and produce a higher score for words with frequencies between high-frequency and low-frequency. For example, the weighting function may produce a low score for high-frequency words such as grammatical particles (e.g., articles, prepositions, and conjunctions). With the calculation of the scores, the mail analyzer 245 may select a set of words with the highest scores from the content of the electronic mail 255 as the subset of keywords for the mail context 345. In some embodiments, the mail analyzer 245 may parse the message body to identify one or more keywords proximate to the set of keywords identified as corresponding to the request to add attachments (e.g., "attached" or "enclosed"). The identified one or more keywords may be five to twenty words from the keywords identified as corresponding to the request to add attachments. The mail analyzer 245 may identify the one or more keywords proximate to the keywords corresponding to the request to add attachments as the mail context 345.

In some embodiments, the mail analyzer 245 may determine that the electronic mail 255 references a calendar event from the mail context 345. The calendar event may represent or indicate a meeting place or time for the sender and the one or more recipients of the electronic mail 255. In some embodiments, the mail analyzer 245 may determine that the electronic mail 255 references the calendar event by applying natural language processing techniques (e.g., named-entity recognition (NER) and terminology extraction). In some embodiments, the mail analyzer 245 may apply the natural language techniques on the message body of the electronic mail 255. Using the natural language processing techniques, the mail analyzer 245 may parse the content of the message body of the electronic mail 255 to identify or extract words, phrases, or sets of alphanumeric characters corresponding to a date or time. For example, using a regular expression, the mail analyzer 245 may determine that a contiguous string in the message body of the electronic mail 255 as corresponding to a date and time (e.g., "July 14 at 2:00 pm" or "7/14 at 2 pm"). Based on the identification of the date or time, the mail analyzer 245 may determine that the electronic mail 255 refers to the calendar event with the date or time. In some embodiments, the mail analyzer 245 may applying the natural language processing techniques on the mail context 345 determined from the electronic mail 255. Using the natural language processing techniques, the mail analyzer 245 may parse the content of the mail context 345 to identify words, phrases, or sets of alphanumeric characters indicative of the calendar invite. For example, the mail analyzer 245 may determine that the subject identifier in the mail context 345 may include the phrase "calendar invite," and may determine that the electronic mail 255 references the calendar event. Based on the identification of words, phrases, or sets of alphanumeric characters from the mail context 345 as indicative of the calendar invite, the mail analyzer 245 may determine that the electronic mail 255 references the calendar invite. In some embodiments, the mail analyzer 245 may send or provide a request for calendar invites with the mail context 345 to the attachment handler 265. In some embodiments, the request for calendar invites may be sent or provided along with the request to add attachments.

In conjunction, the file analyzer 270 may access the files 260 from the file source 305 or stored and maintained on the file database 225. The files 260 may be any set of data to be read by another application and may be of any format, such as text file, a document, a spreadsheet file, an image file, a video file, an audio file, among others. The file source 305 may be any computing device, database, or any storage device storing and maintaining files 260 accessible by the attachment handler 265. In some embodiments, the file source 305 may transmit or provide the files 260 to the file database 225. The file analyzer 270 may in turn access the file 260 from the file database 225. In some embodiments, the file source 305 may provide the server 210 access to the file 260. In some embodiments, the file source 305 may correspond to the client 205 running the mail agent 235 and the attachment agent 230 that identified the request to add attachments. The client 205 may provide the attachment handler 265 access to the file 260. In some embodiments, the file source 305 may correspond to another client 205 besides the client 205 running the attachment agent 230 that identified the request to add attachments. For example, the request to add attachments may be made on the first client 205A, but the file source 305 for the files 260 may be one or more of the other clients 205B-N. In some embodiments, the file database 225 may maintain and store the files 260 originating the file source 305.

Upon receipt of each file 260, the file database 225 may generate or identify metadata for the file 260. The metadata may include a filename of the file 260, a pathname to the file 260 (e.g., with drives, directory, and sub-directories), a source identifier or source address corresponding to the file source 305 or creator of the file 260, a timestamp corresponding to creation of the file 260, a timestamp corresponding to uploading of the file 260, and one or more timestamps corresponding to edits of the file 260, among others. In some embodiments, the file database 225 may retrieve the metadata for the file 260 from the file source 305. In some embodiments, the file database 225 may identify the source identifier or source address corresponding to the file source 305. The source identifier or source address corresponding to the file source 305 may be account identifier corresponding to the user that sends the file 260. In some embodiments, the account identifier may be a screenname, a local part of an email address, or an entirety of the email address, among others for the mail agent 235. In some embodiments, the account identifier may be specific to the remote storage system (e.g., the file-hosting service, cloud-based storage system, or remote backup service) for the file database 225. In some embodiments, the file database 225 may identify a current time in response to receipt of the file 260. The file database 225 may identify the current time as the timestamp corresponding to uploading of the file 260 from the file source 305. The file database 225 may store and maintain the metadata with the file 260. The functionalities of the file database 225 in generating or identifying the metadata for the file 260 may also be performed by the file analyzer 270.

For each accessed file 260, the file analyzer 270 may generate, determine, or identify the file context 320 using content of the file 260. In some embodiments, the file analyzer 270 may identify the file context 320, in response to identification of the request to add attachments to the electronic mail 255. The file analyzer 270 may identify the source identifier of the request to add attachments. In some embodiments, the file analyzer 270 may identify the file context 320, independent of the identification of the request to add attachments to the electronic mail 255. In some embodiments, the file analyzer 270 may identify the file context 320, each time the file 260 is received or stored on the file database 225. The file context 320 may include any information regarding the file 260 used to compare with the mail context 345 identified from the electronic mail 255. The file context 320 for each file 260 may include any one or more portions of the metadata for the file 260 and one or more keywords from the content of the file 260. In some embodiments, the file analyzer 270 may maintain a database to store the file context 320 for the one or more files 260.

In identifying the file context 320, the file analyzer 270 may parse the content of the file 260. The content may include text in the form of one or more alphanumeric strings. In some embodiments, the file context 320 may decode the file 260 to obtain the alphanumeric strings therein in accordance to the file format. The file analyzer 270 may identify one or more keywords in the content of the file 260. In some embodiments, the file analyzer 270 may select a subset of keywords from the content of the file 260 as the file context 230, using various natural language processing and text mining techniques (e.g., term frequency-inverse document frequency (tf-idf)). To select the subset of keywords, the file analyzer 270 may calculate or determine a number of occurrences of each word in the content of the file 260. For each word, the file analyzer 270 may generate a score for the word by adjusting the number of occurrences of each word in the content of the file 260 by a weighing function (e.g., a logarithmic scale). The weighting function may produce a lower score for high-frequency words and low-frequency words and produce a higher score for words with frequencies between high-frequency and low-frequency. For example, the weighting function may produce a low score for high-frequency words such as grammatical particles (e.g., articles, prepositions, and conjunctions). With the calculation of the scores, the file analyzer 270 may select a set of words with the highest scores from the content of the file 260 as the subset of keywords for the file context 320.

Additionally, the file analyzer 270 may use the metadata for the file 260 as the file context 320. In some embodiments, the file analyzer 270 may generate or identify the metadata for the file 260, in a similar manner as the file database 225. As discussed above, the metadata for the file 260 may include a filename of the file 260, a pathname to the file 260, a source identifier or source address corresponding to the file source 305 or creator of the file 260, a timestamp corresponding to creation of the file 260, a timestamp corresponding to uploading of the file 260, and one or more timestamps corresponding to edits of the file 260, among others. Some of the metadata may be embedded in the file 260 itself. In parsing the content of the file 260 itself, the file analyzer 270 may identify the filename of the file 260, the source identifier corresponding to the creator of the file 260, the timestamp corresponding to creation of the file 260, and the one or more timestamps corresponding to edits of the file 260 as the metadata. Using information outside but related to the file 260, the file analyzer 270 may identify the pathname to the file 260, timestamp corresponding to uploading of the file 260, and the source identifier or source address corresponding to the file source 305, among others. With the identification of the metadata, the file analyzer 270 may use the metadata for the file 260 of the file context 320.

The mail analyzer 275 of the attachment handler 265 may generate, determine, receive, or identify the mail context 345 of the electronic mail 255. The mail analyzer 275 of the attachment handler 265 may have similar functionalities as the mail analyzer 245 on the attachment agent 230, as detailed herein above. The mail context 345 identified or determined by the mail analyzer 275 of the attachment handler 265 may include the same data as the mail context 345 identified or determined by the mail analyzer 245 of the attachment agent 230. In some embodiments, the mail analyzer 275 may receive the electronic mail 255 as part of the request to add attachments to the electronic mail 255 from the attachment agent 230. In response to receipt of the electronic mail 255 from the attachment agent 230, the mail analyzer 275 may parse the content of the electronic mail 255, including the message header and the message body, to determine the mail context 345 as detailed herein above with respect to the mail analyzer 245. The mail analyzer 275 may also determine that the electronic mail 255 references a calendar event as detailed herein above with respect to the mail analyzer 245. In some embodiments, the mail analyzer 275 may receive the mail context 345 from the attachment agent 230 to use to compare with the file context 320.

The context comparator 280 may compare the mail context 345 of the electronic mail 255 with the file context 320 of each file 260. In some embodiments, the context comparator 280 may traverse through the file contexts 320 of the files 260 stored on the file database 225. For each file context 320, the context comparator 280 may calculate or determine a correlation score between the file context 320 for the file 260 and the mail context 345 of the electronic mail 255. The correlation score may indicate a semantic similarity between the file context 320 and the mail context 345. The correlation score may also indicate a temporal similarity between the timestamps of the file context 320 and the timestamps of the mail context 345. The correlation score may indicate both semantic similarity and temporal similarity between the file context 320 and the mail context 345. The correlation score may also be representative or may indicate a likelihood that a user will select the file 260 corresponding to the file context 230 as an attachment to the electronic mail 255 associated with the mail context 345.

In some embodiments, the context comparator 280 may select the file contexts 320 of files 260 with the same source identifier or address (e.g., account identifier) as the electronic mail 255 or the mail context 345 for the electronic mail 255. In some embodiments, the context comparator 280 may identify the source identifier or the source address from the mail context 345 or the electronic mail 255 associated with the mail context 345. Using the source identifier or address, the context comparator 280 may traverse through the file contexts 320 of the files 260. When the source identifiers or the source addresses of the mail context 345 and the file contexts 320 match, the context comparator 280 may select the file context 320 of the file 260 for further comparison, as detailed herein below.

In determining the semantic similarity for the correlation score, the context comparator 280 may apply natural language techniques (e.g., semantic knowledge graph) to compare the one or more keywords in the file context 320 with the one or more keywords in the mail context 345. The one or more keywords in the file context 320 for comparison may include the filename, the pathname, and the source identifier or address from the metadata of the file 260, together with the subset of keywords from the content of the file 260. The one or more keywords of the mail context 345 for comparison may include the source identifier, the source address, the recipient identifier, the recipient address, and the subject identifier identified from the message header of the electronic mail 255, as well as the subset of keywords identified from the message body of the electronic mail 255. In some embodiments, the context comparator 280 may identify the filename, the pathname, and the source identifier or address from the metadata of the file 260 and the subset of keywords from the content of the file 260 from the file context 320. In some embodiments, the context comparator 280 may identify the source identifier, the source address, the recipient identifier, the recipient address, and the subject identifier identified from the message header of the electronic mail 255 and the subset of keywords identified from the message body of the electronic mail 255 as the mail context 345.

With the identification of words in the file context 320 and the mail context 345, the context comparator 280 may use a semantic knowledge graph to determine a semantic distance between the words of the file context 320 and the words of the mail context 345. The semantic knowledge graph may include a set of nodes and vertices between the nodes. Each node may represent or correspond to a word of dictionary. Each vertex between two nodes may specify a semantic distance between the words of the two respective nodes. The semantic distance may indicate a degree of semantic similarity between the two words. The context comparator 280 may traverse over the words of the mail context 345 to determine a semantic distance with the words of the file context 320. For each word of the mail context 345, the context comparator 280 may identify a corresponding node in the semantic knowledge graph. The context comparator 280 may then identify the nodes in the semantic knowledge graph corresponding to the words of the file context 320. From the semantic knowledge graph, the context comparator 280 may identify vertices between the node corresponding to the word of the mail context 345 with the nodes corresponding to the words of the file context 320. The context comparator 280 may identify the semantic distances specified by the vertices of the semantic knowledge graph. The context comparator 280 may repeat this functionality over each of the words in the mail context 345. Based on the semantic distances between the words of the mail context 345 and the words of the file context 320, the context comparator 280 may determine an overall semantic similarity for the correlation score between the mail context 345 and the file context 320. In some embodiments, the context comparator 280 may calculate the overall semantic similarity based on a weighted average of the semantic distances between the words of the mail context 345 and the words of the file context 320.

To determine the temporal similarity for the correlation score, the context comparator 280 may compare between the timestamps of the mail context 345 and the timestamps of the file context 320. The timestamps of the mail context 345 for comparison may include the timestamp corresponding to creation of the electronic mail 255, the one or more timestamps corresponding to revisions of the electronic mail 255, the timestamp corresponding to receipt of the message in the thread in the electronic mail 255, and the timestamp corresponding to sending of the message in the thread of the electronic mail 255. The timestamps of the file context 320 for comparison may include the timestamp corresponding to creation of the file 260, the timestamp corresponding to uploading of the file 260, and the one or more timestamps corresponding to edits of the file 260. In some embodiments, the context comparator 280 may identify the timestamp corresponding to creation of the electronic mail 255, the one or more timestamps corresponding to revisions of the electronic mail 255, the timestamp corresponding to receipt of the message in the thread in the electronic mail 255, and the timestamp corresponding to sending of the message in the thread of the electronic mail 255 from the mail context 345. In some embodiments, the context comparator 280 may identify the timestamp corresponding to creation of the file 260, the timestamp corresponding to uploading of the file 260, and the one or more timestamps corresponding to edits of the file 260 from the file context 320.

With the identification of the timestamps in the file context 320 and the mail context 345, the context comparator 280 may calculate or determine the temporal similarity between the file context 320 and the mail context 345. In some embodiments, the context comparator 280 may calculate or determine a difference between at least one of the timestamps of the file context 320 with at least one of the time stamps of the mail context 345. In some embodiments, the context comparator 280 may determine an average time point for the file context 320, using the timestamp corresponding to creation of the file 260, the timestamp corresponding to uploading of the file 260, and the one or more timestamps corresponding to edits of the file 260. The context comparator 280 may determine an average time point for the mail context 345, using the timestamp corresponding to creation of the electronic mail 255, the one or more timestamps corresponding to revisions of the electronic mail 255, the timestamp corresponding to receipt of the message in the thread in the electronic mail 255, and the timestamp corresponding to sending of the message in the thread of the electronic mail 255. The context comparator 280 may calculate a difference between the average time point for the file context 320 and the average time point for the mail context 345. Using the difference between the average time points, the context comparator 280 may determine the temporal similarity the correlation score between the file context 320 and the mail context 345.

With both the semantic similarity and the temporal similarity, the context comparator 280 may determine the correlation score between the mail context 345 and the file context 320. In some embodiments, the context comparator 280 may calculate or determine a weighted average of the semantic similarity and the temporal similarity as the correlation score between the mail context 345 and the file context 320. The semantic similarity may include the semantic distance between words of the mail context 345 and the file context 320, as detailed herein above. The temporal similarity may be represented with the difference between the average time points of the timestamps in the mail context 345 and of the timestamps in the file context 320. In some embodiments, a weight for the temporal similarity may be set at a higher value than a weight for the semantic similarity. In some embodiments, the context comparator 280 may set the weight average of the semantic similarity and the temporal similarity as the correlation score between the mail context 345 and the file context 320.

Based on the comparison between the mail context 345 and the file context 320, the attachment selector 285 may select a subset of the files 260. The subset of files 260 may be from the file database 225 or otherwise accessible by the attachment handler 265 to recommend to the user of the mail agent 235 as attachments to the electronic mail 255. In some embodiments, the attachment selector 285 may wait for the comparison of a threshold number of comparisons between file contexts 320 with the mail context 345 prior to selection. Once the number of comparisons is greater than or equal to threshold number, the attachment selector 285 may initiate selection of the subset of files 260. In some embodiments, the attachment selector 285 may select the subset of files 260 using the correlation scores between the file contexts 320 and the mail context 345. In some embodiments, the attachment selector 285 may sort the files 260 by the correlation scores between the corresponding file contexts 320 for each file 260 and the mail context 345. With the files 260 sorted by correlation score, the attachment selector 285 may select the subset of files 260 with the highest correlation scores.

In some embodiments, the attachment selector 285 may compare the correlation score between the file context 320 and the mail context 345 with a threshold score. The threshold score may represent a cutoff point for the correlation score at which the user of the mail agent 235 is likely to select the file 260 corresponding to the file context 320 as an attachment to the electronic mail 255 associated with the mail context 345. If the correlation score between the file context 320 and the mail context 345 is determined to be greater than or equal to the threshold score, the attachment selector 285 may select the file 260 corresponding to the file context 320 as part of the subset. Conversely, if the correlation score between the file context 320 and the mail context 345 is determined to be less than the threshold score, the attachment selector 285 may leave the file 260 from part of the subset. The attachment selector 285 may provide or relay the subset of files 260 to the agent interface 295.

When the electronic mail 255 is determined to reference a calendar event, the calendar manager 290 may generate a calendar invite using the mail context. The calendar invite may be another file to be recommended as an attachment to the electronic mail 255. For example, the file for the calendar invite may be in accordance to the iCalendar file format, with a file extension such as ".ics," ".ical," or ".ifb." The calendar invite may include a source identifier or source address corresponding to the creator or host of the calendar invite, one or more recipient identifiers or recipient addresses corresponding to the recipients or attendees of the calendar invite, and the date and time for the event corresponding to the calendar invite. In generating the calendar invite, the calendar manager 290 may identify the source identifier or address and the recipient identifiers or addresses from the mail context 345. The calendar manager 290 may use the source identifier or address from the mail context 345 as the source identifier or source address of the calendar invite. The calendar manager 290 may also use the recipient identifier or recipient address from the mail context 345 as the recipient identifier or recipient address of the calendar invite. The calendar manager 290 may set the date and time of the calendar invite to the date and the time extracted from the electronic mail 255. With the generation of the calendar invite, the calendar manager 290 may include the calendar invite as one of the subset of files 260 to recommend to the user of the mail agent 235. In some embodiments, the calendar manager 290 may send or provide the calendar invite to the attachment agent 230.

In some embodiments, the calendar manager 290 may access a location database to identify one or more locations to include the calendar invite. The calendar invite may also include one or more locations for the event. The location database may maintain a list of locations by availability by the date and time. In some embodiments, the location database may be for a physical location (e.g., an office, a campus, or another building) associated with the source address or identifier of the creator of the calendar event or the recipient address or identifier for the recipients of the calendar event. The calendar manager 290 may identify the location database associated with the same source address or identifier of the creator of the calendar event or the recipient address or identifier for the recipients as the calendar event. In some embodiments, the calendar manager 290 may maintain one or more location databases. In some embodiments, the calendar manager 290 may traverse through the list of available locations of the location database. With the location database identified, the calendar manager 290 may search the list of locations by availability using the date and the time extracted from the electronic mail 255. For each location determined to be available at the date and time as identified from the electronic mail 255, the calendar manager 290 may generate the calendar invite further including the location to include in the list of files 375. Once the list of available location is traversed, the calendar manager 290 may send or provide the set of calendar invites as the subset of files 260 to recommend to the user of the mail agent 235.

Using the selection of the subset of files 260, the agent interface 295 may provide the list of files 375 to the attachment agent 230. The list of files 375 may include the subset of files 260 selected based on the comparison of the file contexts 320 with the mail context 345. In some embodiments, the list of files 375 may include the selected files 260 sorted based on the correlation score between the file context 320 for the file 260 and the mail context 345. In some embodiments, the agent interface 295 may generate the list of files 375 using the selection of the files 260 based on the comparison. The list of files 375 may include the filename and the pathname of each selected file 260. In some embodiments, the agent interface 295 may include the calendar invite generated by the calendar manager 290 into the list of files 375. Upon generation, the agent interface 295 may send or provide the list of files 375 to the attachment agent 230.

On the attachment agent 230, the file interface 250 may in turn receive the list of files 375 from the attachment handler 265. The file interface 250 may parse the list of files 375 to identify the files 260 selected based on the comparison of the mail context 345 of the electronic mail 255 and the file context 320 of the files 260. In parsing the list of files 375, the file interface 250 may identify the filename and pathname of each file 260 on the list of files 375. In some embodiments, the file interface 250 may identify from the one or more calendar invites in the list of files 375. With the identification of the files 260, the agent interface 295 may cause the mail agent 235 to display or present a graphic user interface (GUI) for selecting one or more of the files 260 from the list of files 375. The GUI may include the files 260 from the list of files 375 for selection. In some embodiments, the GUI may also include the calendar invite generated by the calendar manager 290. The GUI may display or present the filename and the pathname for each file 260 of the list of files 375. In some embodiments, the GUI may also display or present the date, time, and location of the calendar invites from the list of files 375. The GUI may also provide an option (e.g., in the form of a command button or menu item) to manually search for files 260 to attach to the electronic mail 255. The file 260 may be outside the files 260 recommended as part of the list of files 375.

The file interface 250 may detect, receive, or identify an interaction with the selection GUI. The interaction with the GUI may include a selection of one or more files 260 or the calendar invites from the list of files 375 to recommend as attachments to the electronic mail 255. The interaction with the GUI may also include a selection of a file 260 outside the list of files 375. The file interface 250 may detect the selection of the one or more files 260 or the calendar invites from the list of files 375. When the selection of the one or more files 260 or the calendar invites is detected, the file interface 250 may insert the files 260 corresponding to the selection as attachments to the electronic mail 255. The file interface 250 may identify the files 260 corresponding to the selection on the GUI. In some embodiments, the file interface 250 may retrieve the files 260 locally stored on the client 205 using the filename and pathname for the files 260 from the list of files 375. In some embodiments, the file interface 250 may access the file database 225 using the filename or pathname to retrieve the files 260 corresponding to the selections as attachments to the electronic mail 255. With the retrieval of the files 260, the file interface 250 may insert the files 260 as attachments to the electronic mail 255. The file interface 250 may also identify the calendar invites corresponding to the selection on the GUI. In some embodiments, the file interface 250 may insert the selected calendar invites as attachments to the electronic mail 255. In this manner, the user of the mail agent 235 may select attachments to the electronic mail 255 without manually browsing through the file directory system, thereby improving the functionality of the interface of the mail agent 235.

With the selection of one or more files 260 or calendar invites from the list of files 375 attached to the electronic mail 255, the mail agent 235 may subsequently send the electronic mail 255 with the attachments to the recipient identifier or address. In some embodiments, the file interface 250 may insert or associate a file identifier corresponding to the selected file 260 from the list of files 375 into the electronic mail 255. In some embodiments, the file interface 250 may insert or associate a calendar identifier corresponding to the selected calendar invite from the list of files 375 into the electronic mail 255. When the electronic mail 255 is sent, the server 210 running the attachment handler 265 as part of the electronic mail infrastructure may receive the electronic mail 255 with the file identifier or calendar identifier. In some embodiments, the attachment selector 285 may parse the electronic mail 255 to extract the file identifier corresponding to the selected file 260 from the list of files 375. Using the extracted file identifier, the attachment selector 285 may insert or attach the file 260 corresponding to the file identifier onto the electronic mail 255. In some embodiments, the calendar manager 290 may parse the electronic mail 255 to extract the calendar identifier corresponding to the selected calendar invite from the list of files 375. Using the extracted calendar identifier, the calendar manager 290 may insert or attach the calendar invite corresponding to the calendar identifier onto the electronic mail 255. With the file 260 or calendar invite attached, the server 210 may then send the electronic mail 255 to the client 205 referenced by the recipient address or identifier in the message header of the electronic mail 255.

Conversely or in addition selection of files 260 selected from the list of files 375, the file interface 250 may detect the selection of the one or more files outside the list of files 375. The files outside the list of files 375 may be inserted by the mail agent 235 as attachments to the electronic mail 255. In response to the selection of the files outside the list of files 375, the mail agent 235 may display a file directory system GUI for selecting files manually. The user may browse through the file system of the client 205 and any devices accessible from the client 205 using the GUI. The mail agent 235 may attach any files selected from the file directory system GUI to the electronic mail 255. Additionally, when the selection of the file outside the list of files 375 is detected, the file interface 250 may identify the selection of the files as an attachment to the electronic mail 255. The file interface 250 may also send or provide a notification of the selection to the file analyzer 270 of the attachment handler 265. The notification may indicate that a file 260 outside the generated list of files 375 is selected as an attachment to the electronic mail 255. In some embodiments, the file interface 250 may identify the one or more selected files 260 from outside the list of files 375. The file interface 250 may provide the one or files 260 selected from outside the list of files 375 to the file analyzer 270.

In response to receipt of the notification, the file analyzer 270 may also determine or identify that the selection of the files as attachments to the electronic mail 255 is outside the list of files 375. The file analyzer 270 may identify the files 260 selected from outside the list of files 375. In some embodiments, the file analyzer 270 may access the files 260 from the client 205, the file source 305, the file database 225, or the attachments to the electronic mail 255. In some embodiments, the file analyzer 270 may generate, determine, or identify a file context 320 for the file 260 selected as an attachment to the electronic mail 255 from outside the list of files 375 using the content of the file 260, in the manner as described above. With the generation of the file context 320 for the file 260 selected as the attachment to the electronic mail 255 from outside the list of files 375, the file analyzer 270 may store the file context 320 onto the database. In this manner, the file 260 may be recommended as an attachment in future electronic mail 255 for the user of the mail agent 235.

Figure 4:
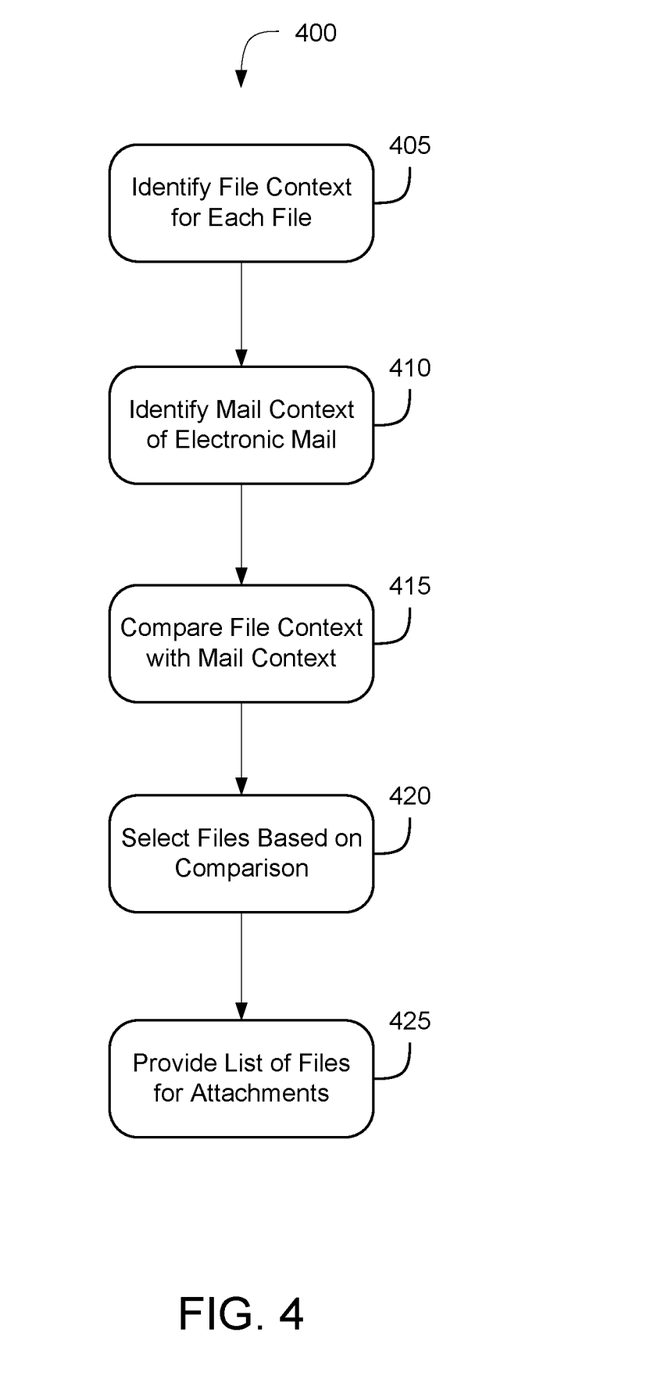
FIG. 4 is a flow diagram of an embodiment for a method of selecting files for electronic mail.

Referring now to FIG. 4, depicted is a flow diagram of an embodiment for a method 400 of selecting files for electronic mail. The functionalities of method 400 may be implemented using, or performed by, the component described herein in conjunction with FIGS. 1-3, such as the client 205, the server 210, and the file database 225. In overview, a computing device (e.g., the client 205 or the server 210 as detailed herein above) may identify a file context of each file (405). The computing device may identify a mail context of an electronic mail (410). The computing device may compare the file context with the mail context (415). The computing device may select files based on the comparison (420). The computing device may provide a list of files for attachments to the electronic mail (425).

In further detail, the computing device may identify a file context of each file (405). The computing device may parse contents of the file to extract or identify the file context. The file context may include at least a portion of metadata about the file and keywords from the content of the file itself. The computing device may apply natural language techniques and text mining techniques to select keywords from the content of the file itself. In addition, the computing device may also identify metadata about the file, such as a filename, pathname, source identifier, a timestamp corresponding to creation of the file, a timestamp of uploading of the file to a database accessible from the computing device, and one or more timestamps corresponding to revisions of the file.

The computing device may identify a mail context of an electronic mail (410). The computing device may parse a message header and a message body of the electronic mail to extract the mail context. From parsing the message header, the computing device may identify a source identifier or address, a recipient identifier or address, a subject identifier, a timestamp corresponding to creation of the electronic mail, and one or more timestamps corresponding to revisions, among others. Additionally, the computing device may apply natural language techniques or text mining techniques to select a subset of keywords from the message body of the electronic mail.

The computing device may compare the file context with the mail context (415). In comparing the two contexts, the computing device may determine a correlation score between the file context for the file and the mail context for the electronic mail. The correlation score may indicate a semantic similarity or a temporal similarity between the file context and the mail context. To determine the semantic similarity, the computing device may apply natural language processing techniques to determine a semantic distance between the words of the electronic mail in the mail context and the words of the file in the file context. To determine the temporal similarity, the computing device may calculate a difference in time between the timestamps in the mail context versus the timestamps in the file context.

The computing device may select files based on the comparison (420). To select the files, the computing device may compare the correlation score for each file with a threshold score. The computing device may include the files with correlation scores greater than the threshold score as recommendations to attach to the electronic mail. On the other hand, the computing device may exclude the files with correlation scores lower than the threshold score from recommendations to attach to the electronic mail.

The computing device may provide a list of files for attachments to the electronic mail (425). The computing device may generate the list of files using the files determined to have correlation scores between the corresponding file context and the mail context of the electronic mail greater than the threshold score. The computing device may sort the files included in the list using the correlation scores. Upon generation, the computing device may provide the list of files for display in a graphical user interface. A user may select one or more of the files from the list of files to attach to the electronic mail.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of selecting one or more files to attach to an electronic mail, comprising:
storing, by a server having one or more processors, in a database, a plurality of files received from one or more clients, prior to a request from a client for one or more attachments;
generating, by the server, responsive to receipt of each file of the plurality of files, a file context to include one or more keywords of content from within the file;
receiving, by the server, the request from the client for the one or more attachments to add to an electronic mail, the request identifying (i) an identifier corresponding to the client and (ii) a mail context for the electronic mail generated by an agent on the client based at least on content of the electronic mail;
identifying, by the server, from the plurality of files in the database, a subset of files for the client based at least on the identifier, responsive to receiving the request;
comparing, by the server responsive to receiving the request, the file context of at least one of the subset of files with the mail context of the electronic mail;
selecting, by the server, one or more files from the subset of files based on the comparison of the file context with the mail context; and
providing, by the server to the agent on the client, a list of the one or more files for selection as the one or more attachments for the electronic mail.

2. The method of claim 1, further comprising:
identifying, by the server, a selection of a file as an attachment for the electronic mail outside the list of the one or more files;
determining, by the server, a second file context of the file outside the list of the one or more files using content of the file.

3. The method of claim 1, further comprising:
determining, by the server, that the electronic mail references a calendar event based on at least the mail context; and
generating, by the server, responsive to determining that the electronic mail references the calendar event, a calendar event invite using the mail context; and
providing the calendar event invite with the list of one or more files for selection as the one or more attachments for the electronic mail.

4. The method of claim 1, further comprising determining, by the server, a correlation score between the file context and the mail context, the correlation score indicating a semantic similarity between the file context of the at least one of the subset of files and the mail context of the electronic mail.

5. The method of claim 1, further comprising determining, by the server, a correlation score between the file context and the mail context, the correlation score indicating a temporal similarity between the file context of the at least one of the subset of files and the mail context of the electronic mail.

6. The method of claim 1, further comprising determining, by the server, a correlation score indicating a similarity between the file context of at least one of the subset of files and the mail context of the electronic mail, and
wherein selecting the one or more files further comprises selecting, from the subset of files, the one or more files each with the correlation score satisfying a threshold score.

7. The method of claim 1, wherein identifying the file context further comprises identifying the file context using metadata of the file, the file context including at least one of a filename, and a time identifier corresponding to uploading of the file; and
wherein identifying the mail context further comprises identifying the mail context using the content having a header field and a message body of the electronic mail, the mail context including at least one of a subject identifier of the electronic mail, and a time identifier corresponding to creation of the electronic mail.

8. A system for selecting one or more files to attach to an electronic mail, comprising:
  one or more processors, coupled to memory and configured to:
    store, in a database, a plurality of files received from one or more clients, prior to a request from a client for one or more attachments;
    generate, responsive to receipt of each file of the plurality of files, a file context to include one or more keywords of content from within the file;
    receive the request from the client for the one or more attachments to add to an electronic mail, the request identifying (i) an identifier corresponding to the client and (ii) a mail context for the electronic mail generated by an agent on the client based at least on content of the electronic mail;
    identify, from the plurality of files in the database, a subset of files for the client based at least on the identifier, responsive to receiving the request;
    compare, responsive to receiving the request, the file context of at least one of the subset of files with the mail context of the electronic mail;
    select one or more files from the subset of files based on the comparison of the file context with the mail context; and
    provide, to the agent on the client, a list of the one or more files for selection as the one or more attachments for the electronic mail.

9. The system of claim 8, wherein the one or more processors are configured to:
  identify a selection of a file as an attachment for the electronic mail outside the list of the one or more files; and
  determine a second file context of the file outside the list of the one or more files using content of the file.

10. The system of claim 8, wherein the one or more processors are configured to:
  determine that the electronic mail references a calendar event based on at least the mail context;
  generate, responsive to determining that the electronic mail references the calendar event, a calendar event invite using the mail context; and
  provide the list of the one or more files with the calendar event invite selectable as attachments for the electronic mail.

11. The system of claim 8, wherein the one or more processors are configured to:
  determine a correlation score indicating a similarity between the file context of at least one of the subset of files and the mail context of the electronic mail; and
  select, from the subset of files, the one or more files each with the correlation score satisfying a threshold score.

12. The system of claim 8, wherein the one or more processors are configured to sort the one or more files of the subset of files by corresponding correlation scores, each correlation score indicating a semantic similarity between the file context of the corresponding file and the mail context for the electronic mail.

13. The system of claim 8, wherein the one or more processors are further configured to sort the one or more files of the plurality of files by corresponding correlation scores, each correlation score indicating at least one of a semantic similarity and a temporal similarity between the file context of the corresponding file and the mail context for the electronic mail.

14. The system of claim 8, wherein the one or more processors are configured to:
  identify the file context using metadata of the file, the file context including at least one of a filename, and a time identifier corresponding to uploading of the file; and
  identify the mail context using the content having a header field and a message body of the electronic mail, the mail context including at least one of a subject identifier of the electronic mail, and a time identifier corresponding to creation of the electronic mail.

15. A method of selecting one or more files to attach to an electronic mail, comprising:
  providing, by an agent on a client having one or more processors, a server access to at least one of a plurality of files stored on a database, prior to a request from the agent for one or more attachments, to cause the server to generate a file context to include one or more keywords of content from within each of the plurality of files;
  detecting, by the agent, the request for one or more attachments to add to an electronic mail;
  generating, by the agent on the client, responsive to detecting, a mail context based on at least content of the electronic mail to include in the request, the request identifying (i) an identifier corresponding to the client and (ii) the mail context;
  sending, by the agent on the client to a server, the request for one or more files to present for selection to add to the electronic mail by identifying a subset of files based at least on the identifier and comparing a file context of at least one file of the plurality of files stored on the database with the mail context of the electronic mail; and
  receiving, by the agent on the client from the server, a list of one or more files for selection as the one or more attachments for the electronic mail.

16. The method of claim 15, further comprising:
  detecting, by the client, a selection of a file as an attachment for the electronic mail outside the list of the one or more files; and
  sending, by the client, the selection of the file outside the list to the server to cause the server to determine a second file context of the file outside the list of the one or more files using content of the file.

17. The method of claim 15, further comprising:
  parsing, by the client, the electronic mail to determine that the electronic mail references a calendar event based on at least the mail context; and
  sending, by the client to the server, responsive to determining that the electronic mail references the calendar event, a request for calendar events including the mail context to cause the server to generate a calendar event invite using the mail context; and
  wherein receiving the list further comprises receiving a list of calendar events with the calendar event invite selectable as attachments for the electronic mail.

18. The method of claim 15, further comprising:
  sending, by the client to the server, the at least one file to store on the database to cause the server to generate the file context for the at least one file, responsive to generation of the at least one file and prior to receipt of the request for the one or more attachments.

19. The method of claim 15, wherein receiving the list further comprises receiving the list of the one or more files sorted by corresponding correlation scores, each correlation score indicating a semantic similarity between the file context of the corresponding file and the mail context.

20. The method of claim 15, wherein identifying the mail context further comprises identifying the mail context using the content having a header field and a message body of the electronic mail, the mail context including at least one of a subject identifier of the electronic mail, and a time identifier corresponding to creation of the electronic mail.

\* \* \* \* \*